United States Patent [19]

Moon

[11] 3,826,439

[45] July 30, 1974

[54] GOLF BALL RETRIEVER

[76] Inventor: Paul G. Moon, 9614 Dona Ct., Crown Point, Ind. 46307

[22] Filed: May 25, 1973

[21] Appl. No.: 363,999

[52] U.S. Cl. ...... 242/54 R, 242/84.1 A, 242/84.2 A, 273/200
[51] Int. Cl. ...................... A63b 69/36, B65h 75/00
[58] Field of Search ........ 242/54 R, 84.2 R, 84.2 A, 242/84.21 R, 84.21 A, 85, 84.1 R, 84.1 A; 273/200, 179

[56] References Cited
UNITED STATES PATENTS

| | | | |
|---|---|---|---|
| 2,714,009 | 7/1955 | Noland | 242/84.2 R |
| 3,191,880 | 6/1965 | Visconti | 242/54 R |
| 3,512,729 | 5/1970 | Miller | 242/84.2 A |
| 3,707,268 | 12/1972 | Kelly | 242/85 |
| 3,735,934 | 5/1973 | Black | 273/200 |

*Primary Examiner*—John W. Huckert
*Assistant Examiner*—Jon W. Henry

[57] ABSTRACT

A compact golf ball retriever including a housing having a golf ball disposed on the outside thereof with a retrieving line wound upon a winding and storage spool located in the housing with one end of the line attached to the spool and the opposite end of the line extending through an opening in the housing and attached to the golf ball, a windup rotor operatively associated with the spool and adapted for movement between an inoperative position freeing and spool for substantially drag free unwinding of the line therefrom and on operative position engaging the reel for winding the line thereupon, a drive shaft extending longitudinally through the central axis of the spool and rotor adapted for driving operation of the rotor as well as selectively shifting the rotor between the operative and inoperative positions, a ball receiving member generally aligned with the housing opening and axially moveable relative thereto in directions towards and away therefrom with the retrieving line passing through anxial aperture in the ball receiving member, the top end of the drive shaft being adapted to engage and move the ball receiving member in a direction outwardly of the housing upon outwardly directed axial movement of the drive shaft so as to urge the golf ball outwardly therefrom, a drive gear connected to the bottom end portion of the drive shaft and engageable by an electric motor to effect the rotative movement of the drive shaft and the connected rotor about its axis to effect rewinding of the line when the rotor is in the operative position, the axial movement of the drive shaft being controlled by a solenoid opeatively connected thereto for shifting the drive shaft and connected rotor between the operative and inoperative positions while also effecting the contact of the top end of the drive shaft with the ball retrieving member to propell the golf ball outwardly therefrom, and electrical circuit means for electrically connecting the motor to a suitable power source to effect rewinding of the line upon the spool, the circuit including elements therein for automatically rendering the motor ineffective upon completion of the rewinding of the line upon the spool along with elements therein for automatically returning the rotor to the inoperative position permitting the free movement of the spool and line upon completion of the rewinding of the line about the spool.

6 Claims, 9 Drawing Figures

PATENTED JUL 30 1974

GOLF BALL RETRIEVER

BACKGROUND OF THE INVENTION

This invention relates generally to ball-retrieving devices and more particularly to a novel and improved automatic golf ball retriever which is compact and efficient in operation.

DESCRIPTION OF THE PRIOR ART

In this day and age of increased recreational time and activities along with the increase of individual convenience items for the consumer, and considering the great amount of time required and inconvenience associated using presently available commercial type golf practice devices, it has been found that the prior art does not present any type of readily available, inexpensive, and readily maintained practice equipment for a golfer to own and use which would permit a golfer to practice driving or putting a golf ball without having to laboriously manually retrieve all balls used in the practice sessions, this retrieval of golf balls normally taking place several times during a normal practice session.

While ball retrieving devices are known, at the present these devices are generally restricted to professional and commercial uses due to both their large size and bulk along with a high initial purchase expense.

Hence while the game of golf is ever increasing in popularity with the number of players increasing on a day-to-day basis, the golfer is left with no simple means of practicing driving and putting other than utilization of a driving or putting range, and as such ranges are normally located in inconvenient locations, the golfer has no option other than to practice at home or at the office using a great number of golf balls, and then procede to manually retrieve the balls himself at the end of the practice session or when the supply of balls has diminished so that they must be retrieved for further usage.

SUMMARY OF THE INVENTION

The present invention is designed to overcome the above discussed limitations that are presently attendant upon the major populace of present day golfers by providing a novel golf ball retrieving device which is simple and efficient in operation and which will meet the widespread public demand for a relatively inexpensive automatically operable retrieving device.

Further, the present invention provides a novel golf ball retrieving device permitting selectability of retrieval speeds for the golf ball depending upon whether the ball is hit a long distance, such as when practicing driving, or if the ball is only hit a short distance, such as when practicing putting.

Still further, the present invention provides a golf ball retrieval device which closely simulates uninhibited free flight of a golf ball after being struck by a golf club by providing a retrieval mechanism which minimizes drag effect on the flight of the ball and utilizes a retrieval line which is both strong and light weight such that it produces only minimum drag effects on the ball.

It is a feature of the present invention to provide a golf ball retrieving device which is relatively inexpensive, compact and portable in nature, and is suitable for use by both the professional and amateur golfer in a manner eliminating the laborious manual retrieval of practice golf balls.

A further feature of the present invention provides a golf ball retrieving device which is fully automatic in operation such that upon initiation of the operation of the motor the golf ball is automatically retrieved to the device, at which time the motor is automatically disconnected and the windup mechanism automatically restored to the initial free play position so that the golf ball is again ready for free usage.

A further feature of the invention provides a multipurpose handle of the device which is operative in one position to facilitate the carrying and portability of the device from one location to another location, with the handle being moveable to a second position wherein the device is inclined at an angle to the ground so that during practice driving the pay-out of the line out of the retrieving device in following the flight of the ball is substantially at the same angle at which the ball left the ground upon being struck by the club so as to assist in minimizing drag tendencies on the ball during flight.

The provision of a golf ball retrieving device such as briefly outlined above, and possessing the stated advantages, constitutes the principle features of the present invention. The provision of a retrieval device which is simple in its construction and which therefore may be readily manufactured at a low cost and by simple manufacturing methods utilizing many mechanical parts which are standard components and readily available on the market; one which is rugged and durable and which therefore may be guaranteed by the manufacturer to withstand usage by both the professional and amateur golf player; one which is aesthetically pleasing and refined in appearance; one which is highly compact, light weight and extremely efficient in operation; one which utilizes a minimum number of mechanical elements thus minimizing the possibility of mechanical breakdown and permitting ease of operation; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENTS

Figure 1:
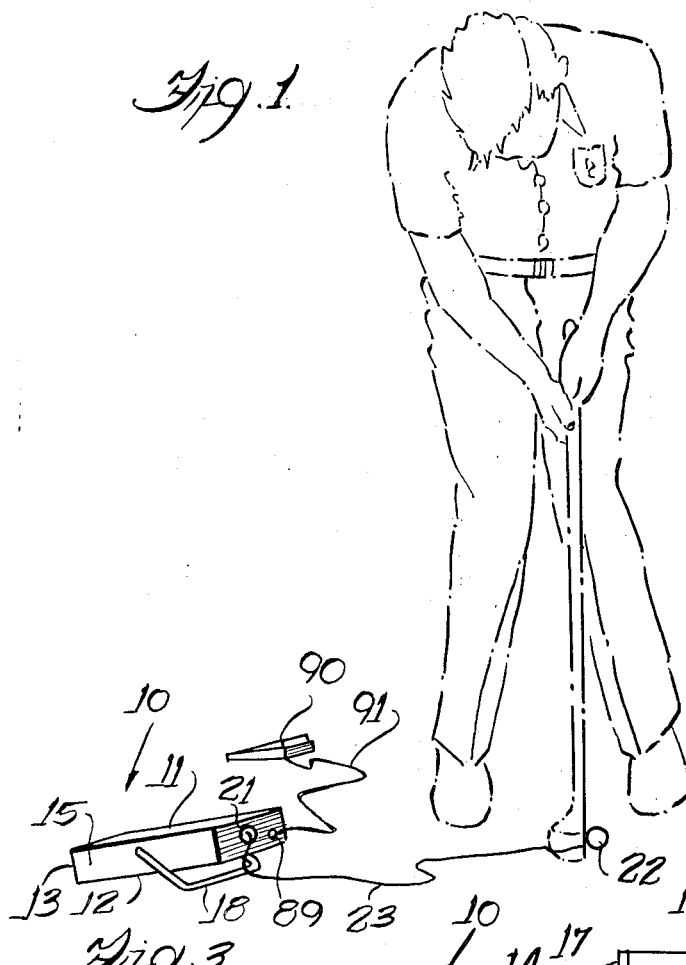
FIG. 1 is a perspective view of the preferred mode of operation of the golf ball retriever of the present invention during driving practice.
Figure 2:
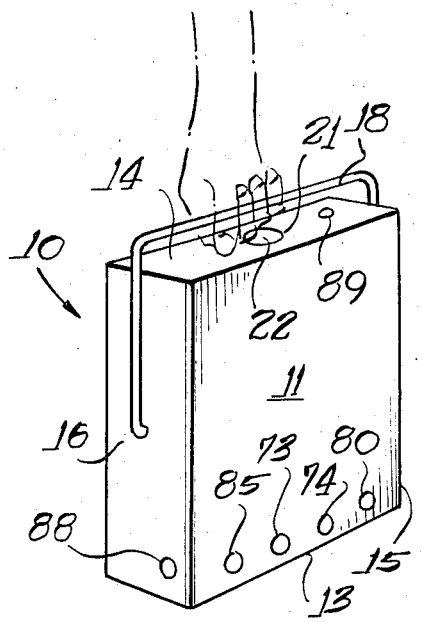
FIG. 2 is a perspective view of the golf ball retriever with the handle in position for carrying between locations.
Figures 3, 4:
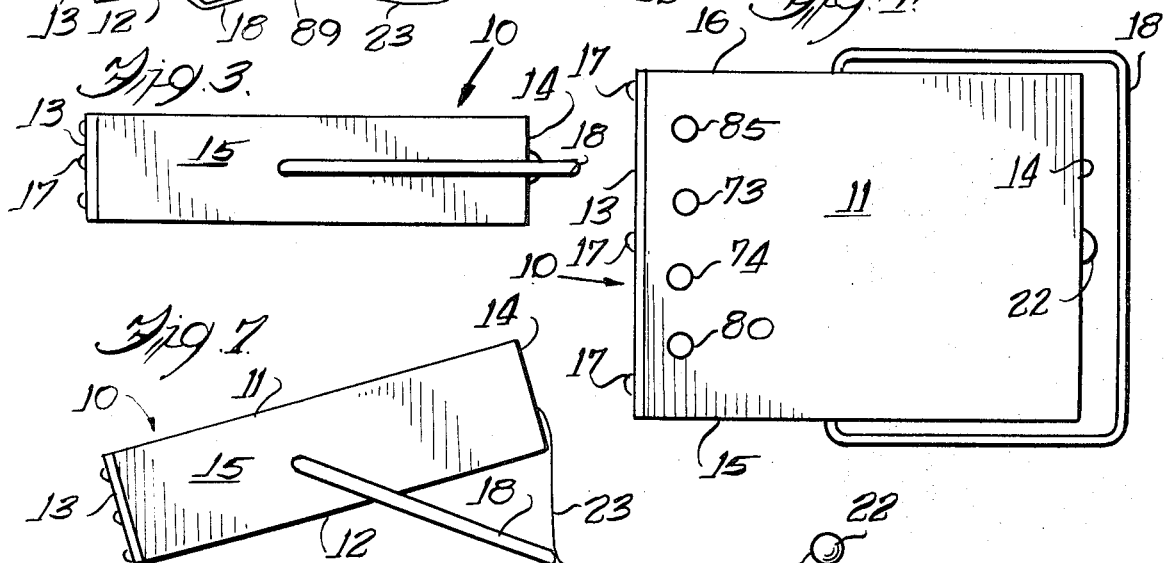
FIG. 3 is a side elevational view of the golf ball retriever of FIG. 2.
FIG. 4 is a top plan view of the golf ball retriever of FIG. 2.

With reference to the drawings in general, reference numeral 10 generally designates the golf ball retrieving device of the present invention. The device 10 includes a housing having a top 11, a bottom 12, a back end 13, a front end 14, and sides 15 and 16 respectively. The bottom 13 may be provided with a series of bumpers or supports 17 for resting the device on the ground. A handle 18 is provided having opposed ends connected to sides 15 and 16 respectively, the handle facilitating ease of carrying the device from one location to another and also adapted for utilization in propping the device at an angle to the ground for use during driving practice as will be discussed later.

An opening 21 is provided in front end 14 and is adapted to receive a conventional golf ball 22 therein, the golf ball being attached to the retrieving device by having one end of a thin fishing type line 23, such as nylon or the like, connected thereto such as by a member 24 that is imbedded in the ball, or the like. The line passes through opening 21 into the device 10 where it is wound upon a winding and storage spool 26 which forms a component part of a conventional type fishing rod reel generally designated by reference numeral 28 and including a rotor 29 axially aligned with spool 26 and disposed adjacent thereto and adapted to be rotatively driven about its axis by a drive shaft 30 extending axially through the spool and rotor and which is attached to the rotor in a known manner for changing the rotor between an operative position in driving engagement with the spool and an inoperative position, not driving the spool.

The structure of the reel 28 is that of a conventional fishing rod reel with the preferred embodiment utilizing the components from the commercial fishing reel known as Johnson 710 fishing rod spinning reel manufactured by Denison-Johnson, Inc. of Mankato, Minnesota. However, it is to be understood that other conventional drag-free storage and winding reels may be utilized within the scope of the present invention.

Figure 8:
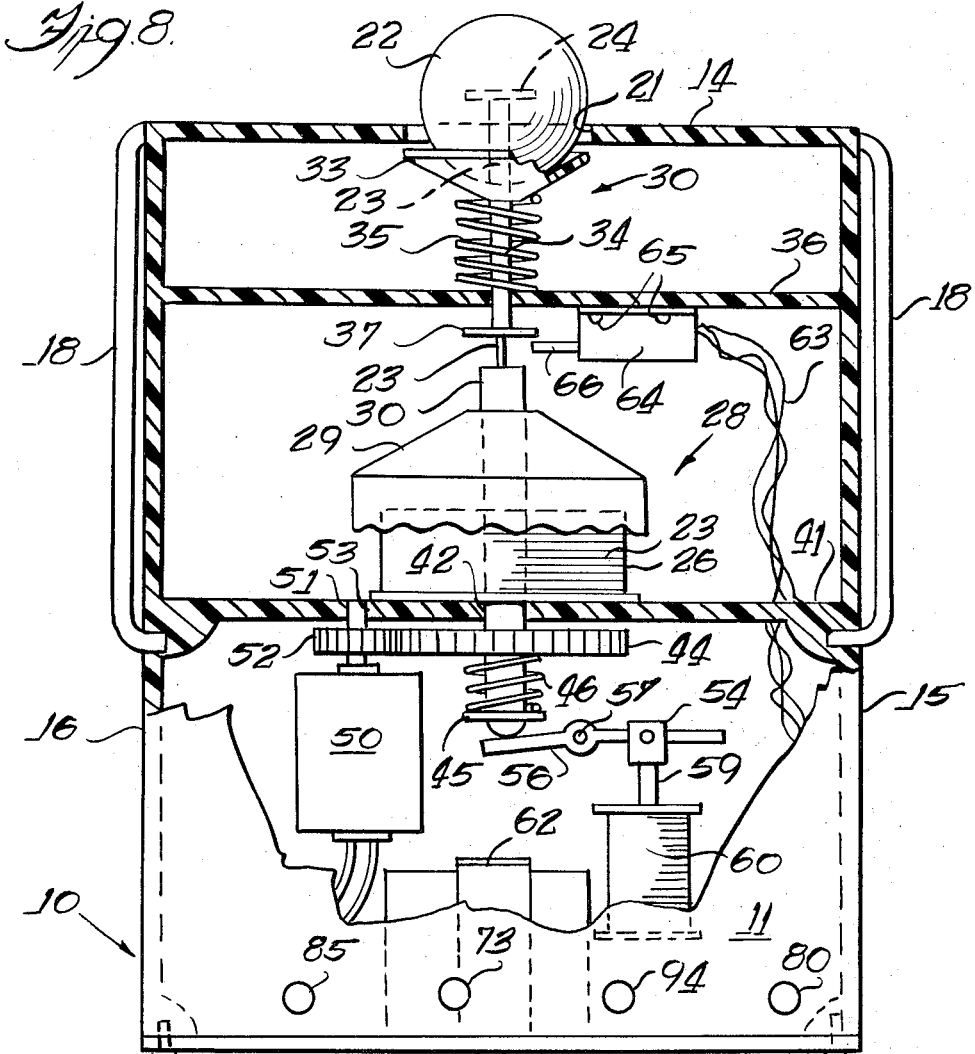
FIG. 8 is an enlarged top plan view, partially in section and partially broken away, of the golf ball retriever device.

Referring now to FIG. 8 it is seen that preferably opening 21 and the drive shaft 30 are in axial alignment so that the line 23 may be payed-off of spool 26 and fed in the conventional fishing rod reel meanner through shaft 30 and out of opening 21 in a manner providing a minimum of drag on the line. Interposed between opening 21 and the top end of drive shaft 30 is a ball receiving member generally designated by reference numeral 32 having a conically formed inwardly directed ball receiving cup 33 with a rod-like support member 34 extending therefrom and aligned with drive shaft 30 and having a spring 35 disposed concentrically about rod 34 extending between cup 33 and the adjacent surface of a support member 36 extending transversely between sides 15 and 16 of the device 10. The rod 34 has an axial aperture extending longitudinally therethrough for passage of line 23 therethrough between spool 26 and ball 22. The rod 34 projects through support surface 36 and is supported therein for axially directed reciprocal motion. The bottom end of rod 34 is equipped with an operating arm 37 extending generally transversely relative thereto, the purpose thereof which will be described in later paragraphs.

The reel 28 is mounted in a conventional manner on a surface 41 extending transversely between sides 15 and 16 of device 10, with drive shaft 30 extending axially through an opening 42 in surface 41 and having a gear 44 connected thereto in a conventional manner so that the drive shaft 30 may move axially relative to the gear while still being rotatively driven by the same. A retaining washer 45 is secured to the bottom end portion of the drive shaft 30 with a spring 46 interposed between the retaining washer 45 and the adjacent surface of the gear 44 urging the drive shaft in a direction away from opening 21. Radially displaced from drive shaft 30 is an electric motor 50 having a shaft 51 extending outwardly therefrom in a direction and manner substantially parallel to the drive shaft with a gear 52 connected thereto, the outer end of shaft 51 being received in an opening 53 in surface 41 in a manner positioning the gear 52 in meshing engagement with gear 44 in order to drive the same upon energization of motor 50.

Disposed beneath the bottom end of drive shaft 30 and in moveable contact therewith is a lever 56 pivotally mounted about point 57 having one end adapted for engagement with the bottom end of drive shaft 30 with the opposite end operatively connected by a member 58 to the end of a plunger 59 of an electrical solenoid 60 such that energization of solenoid 60 will draw plunger 59 thereinto, thus effecting the axial movement of drive shaft 30 in a direction towards opening 21 to effect the engagement of the top end of the drive shaft 30 with the bottom end of the rod 34 while simultaneously disengaging rotor 29 from spool 26 permitting the free rotation of the spool to effect the free pay-out therefrom of the line 23. An electrical circuit is provided for electrically connecting the motor 50 to a battery 62 which is also suitably connected to solenoid 60 by means of insulated wire, such as indicated by reference numeral 63, with a single-pole, double-contact normally-closed switch 64 being provided, the use thereof which will be as discussed in later paragraphs. The switch 64 may be of any conventional microswitch construction which is mounted by screws 65 to surface 36 and has an operating lever 66 projecting outwardly therefrom in a path to be encountered and operated by arm 37 on ball receiving member 32 such that while the switch is initially normally closed between the pole and one particular stationary contact, upon the ball 22 being received in cup 33 and moving rod 34 axially inwardly of the housing until arm 37 engages and moves operating arm 66 of the switch, at which time the switch 64 is operated to disconnect the pole from the first stationary contact and connect the pole to the second stationary contact in the switch. This position is retained until after the drive member 30 is axially moved to engage rod 34 and return the ball retaining member 32 to its original position at which time switch 64 returns to its normally closed initial operating position.

Figure 9:
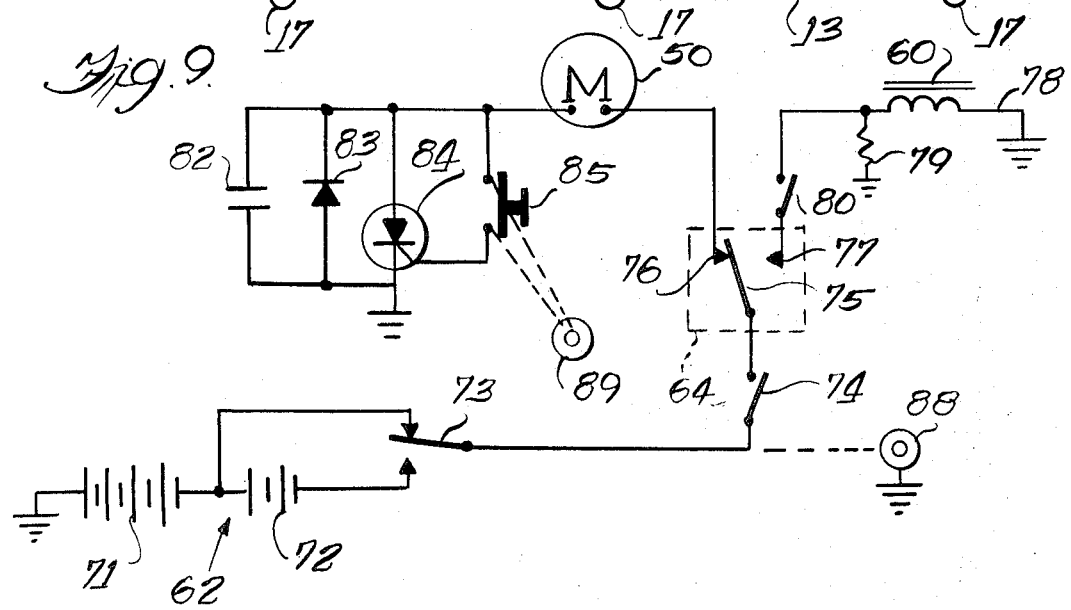
FIG. 9 is a schematic of the electrical circuitry of the golf ball retriever device.

The details of the electrical circuitry are shown in FIG. 9 wherein battery 62 is shown as consisting of two separate power segments 71 and 72, 71 being approximately a 9 volt direct current battery with 72 being approximately a 3 volt direct current battery, the batteries 71 and 72 being connected in series relationship and a switch 73 provided which permits a player to select between utilization of only 9 volt battery 71, or alternatively, utilization of the series combination of batteries 71 and 72 providing a total voltage of 12 volts for operation of the device. As the motor 50 is a multi-voltage motor, it is apparent that operation at 9 volts will be slower than operation at 12 volts so that the operator of the device may utilize switch 73 to set the motor for either a high speed of ball return or a low speed of ball return, this normally being selected depending upon whether the operator is practicing driving shots where a great amount of line 23 must be rewound and the ball 22 retrieved from a great distance, at which the high speed would be desired, or whether the operator is practicing short putting type shots where only a short amount of line 23 would be utilized and have to be rewound on spool 26 so that only the slow speed of ball return would then be utilized. A master on-off switch 74 is provided having one end connected in series to switch 73 with the opposite end connected to the common pole 75 of previously identified switch 64. Switch 64 is shown in the normally closed initial operating position where pole 75 is in normal biased contact with stationary normally closed contact 76 which in turn is connected in series to one end of motor 50. Normally open contact 77 of switch 64 is connected in series with a solenoid control switch 80 which, in turn, is in series with solenoid 60, the opposite end of solenoid 60 being connected by wire 78 to the opposite end of battery 71. To prevent chattering of solenoid 60 there is preferably provided a resister 79 connected in parallel with the solenoid, the value of this resistance selected depending upon the characteristics of the solenoid with tests indicating that for a normal 6 to 9 volt direct current solenoid a resistor value of 10 ohms at 2 watts would be sufficient.

While one end of motor 50 is connected in series with normally closed contact 76, the opposite end of the motor is connected in series with a motor control circuit generally consisting of a parallel combination of a capacitor 82, a diode 83, and a siliconcontrolled rectifier 84. A switch 85 is provided having one end connected in series with the motor at the same end to which the motor control circuit is connected, with the opposite end connected to the control gate of the silicon-controlled rectifier 84 such that when all switches are set to provide power to the motor all that the operator has to do is momentarily close the switch 85 to place a voltage across the gate of silicon-controlled rectifier 84 thereby effecting operation of the same to complete the circuit and energize motor 50 which motor will than stay energized until either switch 64 is operated in the normal automatice manner as will later be described, or alternatively, until the user of the device turns off the master power switch 74.

While the preferred embodiment of the device is self-contained as to its own battery powered source 62, there is provided an auxiliary input power jack adapter 88 for utilization of a power source external of the device, such as when the batteries are being recharged or replaced so that the device may still be operated by utilization of such an auxiliary power source, such as a vehicle battery and the like.

Further, for additional ease of operation there is provided, in addition to switch 85 which is mounted on device 10, an auxiliary input jack 89 connected in parallel with switch 85 and permitting the use of a foot control foot pedal 90 (FIG. 1) which by suitable insulated wire 91 is connected to auxiliary operating jack 89 so that retrieval of the ball may be accomplished by the player merely stepping momentarily on the foot pedal to initiate operation of the device.

The operation of the device is extremely simple in order to permit the player to devote his full attention and interest to the hitting of the ball, with a minimum of detraction from the operation or control of the retrieving device. As the circuit will henceforth be described, the present invention has been so designed that, except for the actuation of a main power switch and the solenoid control switch during the initial first stage of usage of the device and then the later operation of the foot pedal each time the retrieval of the ball is required, there are no other operating procedures of any kind required of the user. As will be described, the operation of the foot pedal serves automatically to energize the motor thus automatically placing the rotor in operative driving position for driving the spool to rewind the line thereon, and upon completion of the winding operation and the ball returning into the ball receiving member, the motor is automatically disconnected with the rotor also being automatically disengaged from the spool so that the spool is returned to its free wheeling line pay-out position permitting the free usage of the ball once again.

Figure 7:
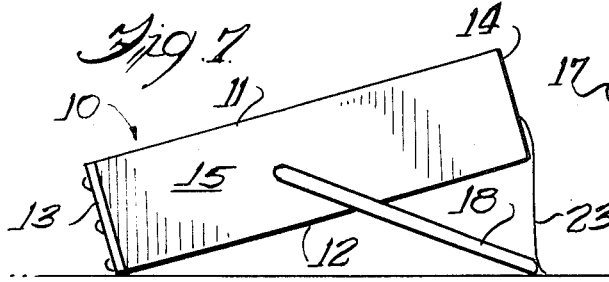
FIG. 7 is a side elevational view of the golf ball retriever showing the handle in position to maintain the device at a selected angle to the ground for minimizing drag on the line as it is payed out of the device during practice driving.
Figure 5:
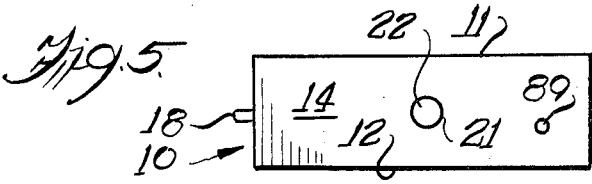
FIG. 5 is a front end elevational view of the golf ball retriever of FIG. 2.
Figure 6:
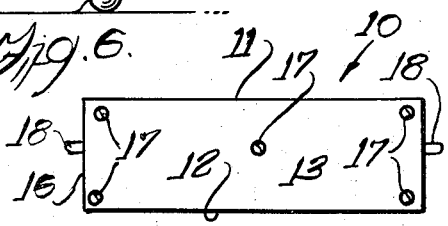
FIG. 6 is a back end elevational view of the golf ball retriever of FIG. 2.

In operation, the device 10 is placed on the ground with the handle 18 supporting the device at an angle to the ground at approximately 15° to about 25° depending on the preference of the player, this being for practicing driving. Switch 73 is set to either a 9 volt or 12 volt position by the user, depending upon whether a fast or slow ball return is desired, after which master power switch 74 and solenoid control switch 80 are placed in the on position. The player then momentarily depresses the switch 85 or foot pedal 90 which momentarily energizes solenoid 60 thereby placing the rotor 29 in the inoperative position freeing ball 22, with drive shaft 30 striking the end of rod 34 or ball receiving member 32 in a manner to propell the ball out of cup 33 and opening 21 so that the ball will drop to the ground for useage in a manner as illustrated in FIG. 7. The user then drives or putts the ball in the normal manner, this being generally as shown in FIG. 1. After the ball has been driven by the player, to retrieve the same all that is required is that the player momentarily steps on foot pedal 90, or if more desirable, bend over and momentarily depress rewind switch 85. This initiates the conducting of silicon-controlled rectifier 84 in a manner to complete the motor circuit thereby energizing the motor 50 in a manner to drive the gear 44, drive shaft 30, and rotor 29, this driving rotative movement engaging the rotor 29 with the spool 26 in a known manner of fishing rod reels by conventional means within the reel 28 so that the line 23 is wound upon the spool 26 to retrieve ball 22 into ball receiving member 32. This driving motion continues until ball 22 is engaged in cup 33 effecting the inward movement of rod 34 until arm 37 engages operating lever 66 of switch 64 which in turn disengages common pole 75 from normally closed stationary contact 76 thus breaking the circuit and deenergizing motor 50. At the same time the common pole 75 makes contact with normally open stationary contact 77 thus energizing solenoid 60 in a manner to move drive shaft 30 in an outward direction to release spool 26 and to forcibly engage the bottom end of rod 34 thus propelling ball 22 outwardly of cup 33 while at the same time returning switch 64 to its normally closed position opening the circuit to solenoid 60 and thus deenergizing the solenoid while returning the motor circuit to its initial position waiting for the next activation by operation of rewind switch 85 or foot pedal 90.

Upon completion of use of the device, and in preparation for storage of the golf ball 22 firmly within ball receiving member 32, after driving the ball and prior to energization of rewind switch 85, the player opens switch 80 thus disengaging the solenoid circuit so that upon energization of rewind switch 85 the ball 22 is retrieved into cup 33 with all sequence operations being as afore described except that since switch 80 is open the solenoid 60 will not be energized so that the motor is deenergized upon return of the ball but the ball will stay firmly retained in position for transportation and carrying of the device with it only be required that the player turn off the master power switch 74.

It is to be appreciated that the switches intended for operation by the player may be positioned at any convenient location about the device 10, with the preferred embodiment locating foot pedal jack 89 in the front end surface 14, auxiliary power jack 88 is located in side surface 16, and switches 73, 74, 80, and 85 are located in top surface 11.

It is to be understood that other embodiments of the invention are envisioned as well as other uses, such as utilization as a baseball retrieving device and the like, all being envisioned within the scope of the present invention.

It is to be understood that the form of this invention herewith shown and described is to be taken as a preferred example of the same and that this invention is not to be limited to the exact arrangement of parts shown in the accompanying drawings or described in this specification as various changes in the details of construction as the shape, size, and arrangement of parts may be resorted to without departing from the spirit of the invention, the scope of the novel concepts thereof, or the scope of the sub-joined claims.

Having thus described the invention, what is claimed is:

1. A golf ball retrieving apparatus comprising:
   a housing;
   a golf ball located outside of the housing;
   a retrieving line wound upon a winding and storage spool disposed in the housing and having one end connected thereto with the opposite end passing through an opening in the housing and fixedly connected to the golf ball;
   a ball receiving member slideably mounted in the housing and generally aligned with the housing opening and axially moveable relative thereto with the line passing through an axial aperture in the ball receiving member;
   a windup rotor slideably mounted in the housing for movement between an inoperative position freeing the spool for substantially drag free unwinding pay-out of the line therefrom, and an operative position engaging the spool for winding the line thereupon;
   a drive shaft extending longitudinally through the central axis of the spool and the central axis of the rotor for driving operation of the rotor and shifting the rotor between the operative and inoperative positions, the drive shaft being axially moveable with the top end of the drive shaft adapted to engage and move the ball receiving member in a direction outwardly of the housing to propell the golf ball outwardly therefrom; and means for controlling winding and unwinding of the line including:
   a drive gear connected to the bottom end portion of the drive shaft for rotatively driving the shaft;
   an electric motor having gear means associated therewith engaging the drive gear in a manner to drive the same to rotate the rotor on its axis to effect rewinding of the line when the rotor is in the operative position engaging the spool;
   electromagnetic means for moving the drive shaft relative to the spool for shifting of the rotor between the operative and inoperative positions and also effecting the contact of the top end of the drive shaft with the ball receiving member to propell the golf ball outwardly therefrom;
   an electrical circuit for electrically connecting the motor or said electromagnetic means to a suitable power source to effect rewinding of the line upon the spool or to move the drive shaft respectively;
   means for automatically disconnecting the motor upon completion of the rewinding of the line on the spool; and
   means for automatically returning the rotor to the inoperative position permitting the free movement and pay-out of the line from the pool upon completion of the rewinding of the line on the spool.

2. A golf ball retrieving apparatus as set forth in claim 1 further characterized by said means for controlling winding and unwinding comprising:
   a rewind switch in the circuit for initially momentarily energizing the motor;
   a first switch in the circuit having switching elements for automatically deenergizing the motor upon completion of rewinding of the line on the spool;
   a second switch in the circuit having switching elements for automatically effecting the operation of the electromagnetic means to shift the rotor to the inoperative position to free the line on the spool for pay-out upon completion of the rewinding of the line on the spool, and to propell the ball outwardly from the ball receiving member; and
   control arm means connected to the switching elements and in the path of travel of the ball receiving member and moveable by the ball receiving member when the line is completely reeled in to automatically open the switching elements of the first switch to electrically disconnect the motor and automatically close the switching elements of the second switch to energize the electromagnetic means to cause the drive shaft to move axially outwardly and move the rotor to the inoperative position while the top end of the drive shaft encounters the ball receiving means effecting the outward movement thereof to allow the switching elements of both the first and second switches to return to their normal positions thus disconnecting the electromagnetic means and returning the motor circuit to the initial position preparatory for further energization for ball retrieving purposes.

3. A golf ball retrieving apparatus as set forth in claim 2 further comprising:

a source of power;

a master on-off switch having switching elements connected in series with the power source for selectively energizing and deenergizing the ball retrieving apparatus;

the first switch being a normally closed switch having the switching elements connected in series with the switching elements of the master on-off switch and the motor and adapted for operation by the ball receiving member in a manner such that when a ball is in the ball receiving member the switch is placed in an open position thus opening the switching elements and deenergizing the motor;

the motor having one end connected in series with the switching elements of the normally closed switch with the opposite end connected in series with a motor control circuit comprising a part of said electrical circuit which is interposed in series between the motor and the source of power;

the motor control circuit comprising a silicon-controlled rectifier connected in parallel with a parallelly connected capacitor and diode, a rewind switch having one end connected to the anode of the silicon-controlled rectifier with the other end connected to the control gate of the silicon-controlled rectifier such that momentary contact of the rewind switch initiates the operation of the silicon-controlled rectifier in a manner to energize and maintain operation of the motor until the motor circuit is automatically disconnected by the golf ball being received in the ball retaining member which in turn operates the switching elements of the normally closed switch to open the circuit and thus deenergize the motor; and the second swtich being a normally open switch adapted for operation by the ball receiving member upon receipt of the golf ball therein such that upon operation the switching element of the normally open switch is closed thus energizing the electromagnetic means in a manner to drive the drive shaft axially outwardly to shift the rotor to the inoperative position and to engage the ball receiving member and propell the ball outwardly therefrom allowing the first normally closed switch to return to its normal initial normally closed position in a manner restoring the motor operating circuit to its initial position preparatory for further activation and utilization by the player utilizing the golf ball retrieving apparatus.

4. A golf ball retrieving apparatus as set forth in claim 3 further characterized by the power source comprising at least two series connected batteries of different voltages, and a rewind speed control switch interposed in series between the batteries and the master on-off switch for selecting the desired battery voltage depending upon the desired speed of operation of the electric motor which varies as a function of the voltage applied thereto by the power source.

5. A golf ball retrieving apparatus as set forth in claim 4 further characterized by a U-shaped carrying handle having a bight portion and opposite ends, the ends being pivotally attached to opposite sides of the housing and swingable thereabout between a carrying position adapted for utilization in transporting the apparatus between locations of usage, and a supportive position with the bight portion adapted to engage the support surface to support the housing at an upwardly inclined angle relative to the support surface in a manner to provide minimum drag on the retrieving line, the angle of support being selectable by the player from about 10° to about 30° relative to the support surface.

6. A golf ball retrieving apparatus as set forth in claim 5 further characterized by the electromagnetic means consisting of an electrically operated solenoid having a plunger member therein adapted for reciprocal movement relative thereto in a manner to effect the reciprocal operation of the drive shaft along its longitudinal axis.

* * * * *